(12) United States Patent
Lee et al.

(10) Patent No.: US 11,554,824 B2
(45) Date of Patent: Jan. 17, 2023

(54) MOBILITY UNIT

(71) Applicants: Hyundai Motor Company, Seoul (KR); Kia Motors Corporation, Seoul (KR)

(72) Inventors: Sang Heon Lee, Seoul (KR); Jin Ho Hwang, Seoul (KR); Dong Eun Cha, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 686 days.

(21) Appl. No.: 16/585,842

(22) Filed: Sep. 27, 2019

(65) Prior Publication Data

US 2020/0317280 A1 Oct. 8, 2020

(30) Foreign Application Priority Data

Apr. 4, 2019 (KR) .................. 10-2019-0039657

(51) Int. Cl.
| | |
|---|---|
| *B62D 59/04* | (2006.01) |
| *B60L 50/50* | (2019.01) |
| *B62D 47/00* | (2006.01) |
| *B62D 63/02* | (2006.01) |

(52) U.S. Cl.
CPC .............. *B62D 59/04* (2013.01); *B60L 50/50* (2019.02); *B62D 47/00* (2013.01); *B62D 47/006* (2013.01); *B62D 63/025* (2013.01); *B60L 2200/24* (2013.01)

(58) Field of Classification Search
CPC ...... B62D 59/04; B62D 47/00; B62D 47/006; B62D 63/025; B60L 50/50; B60L 2200/24
See application file for complete search history.

(56) References Cited

U.S. PATENT DOCUMENTS

2020/0216122 A1\* 7/2020 Baust ..................... G05D 1/021
2020/0307437 A1\* 10/2020 Thieberger ........... G05D 1/0214

FOREIGN PATENT DOCUMENTS

| JP | 2001-222790 A | | 8/2001 |
|---|---|---|---|
| JP | 2012-105514 A | | 5/2012 |
| JP | 2012105514 A | \* | 5/2012 |
| KR | 20-1999-0023279 U | | 7/1999 |
| KR | 10-0923209 B1 | | 10/2009 |
| KR | 10-2017-0133403 A | | 12/2017 |
| KR | 10-2018-0047271 A | | 5/2018 |

OTHER PUBLICATIONS

JP-2012105514-A Machine Translation. (Year: 2022).\*

\* cited by examiner

*Primary Examiner* — David V Henze-Gongola
(74) *Attorney, Agent, or Firm* — Morgan, Lewis & Bockius LLP

(57) ABSTRACT

A mobility unit may include a driving portion connected to a driveshaft of a vehicle for providing driving force to the vehicle, a rear glass portion provided at a rear portion of the vehicle to be operable to isolate the rear portion of the vehicle, a front connection portion or a rear connection portion provided at the front or at the rear of the vehicle to be fastened to another vehicle, and an integrated controller for controlling the operation of the front connection portion or the rear connection portion depending on the direction in which the vehicle is coupled to another vehicle and controlling the operation of the rear glass portion and the driving portion when the vehicle is coupled to another vehicle.

13 Claims, 5 Drawing Sheets

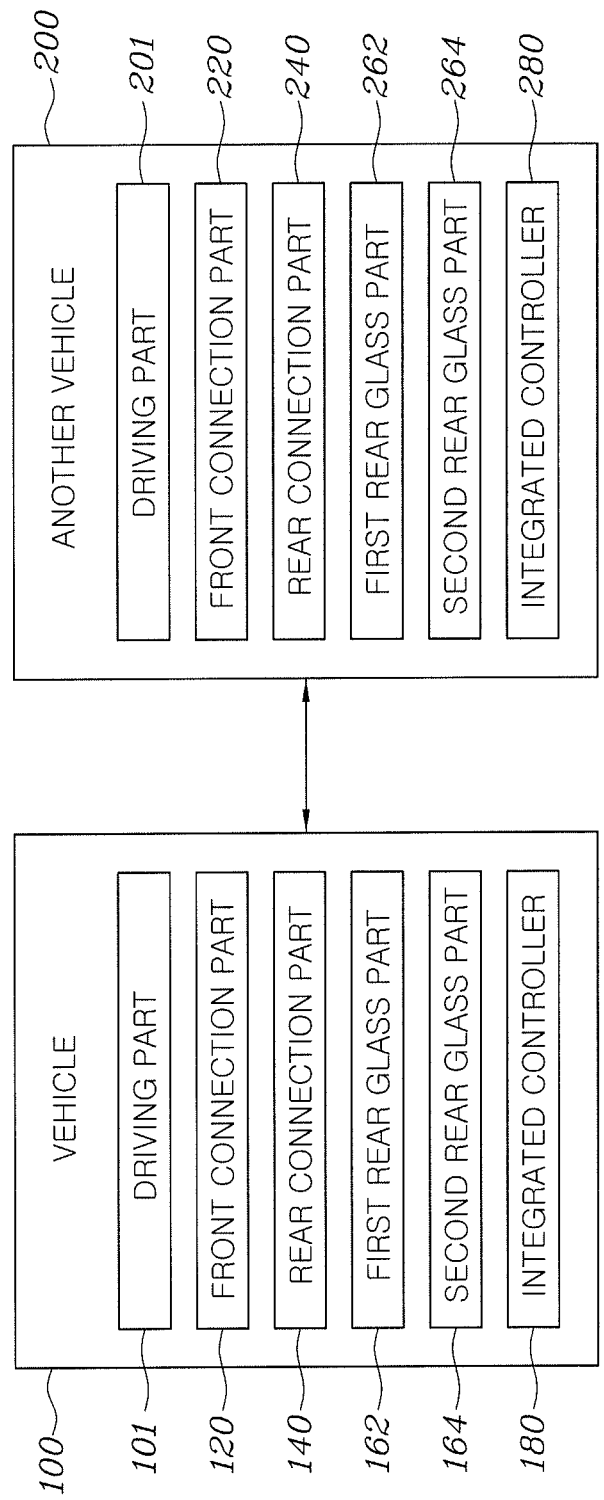

MOBILITY UNIT

CROSS-REFERENCE TO RELATED APPLICATION

The present application claims priority to Korean Patent Application No. 10-2019-0039657, filed on Apr. 4, 2019 in the Korean Intellectual Property Office, the entire contents of which is incorporated herein for all purposes by this reference.

BACKGROUND OF THE INVENTION

Field of the Invention

The present invention relates to a mobility unit capable of coupling a vehicle and another vehicle and connecting internal spaces of the vehicles to each other or isolating the internal spaces of the vehicles from each other.

Description of Related Art

With the development of electric vehicles, a subminiature mobility has been suggested. The subminiature mobility is configured in a form of a single-seated mobility or a two-seated mobility. Due to the limitations in the engine capacity of an electric vehicle, the subminiature mobility is expected to be mainly used for short distances, for example, for commuting or grocery shopping. Depending on the circumstances, however, the situation may occur in which it is necessary to drive the subminiature mobility a long distance.

In the case in which the subminiature mobility is driven a long distance, various burdens, such as a battery-related problem or fatigue due to long-distance driving, may occur. In the case in which the subminiature mobility is coupled to another subminiature mobility in the present situation, it is possible to share batteries of the mobilities and select the driver of the mobilities. For these reasons, there is necessity for aggregate travel.

To date, however, the hardware of the subminiature mobility has been intensively developed, but no concept of aggregate travel or coupled travel has been suggested.

The information disclosed in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a mobility unit configured for coupling a vehicle and another vehicle and connecting internal spaces of the vehicles to each other or isolating the internal spaces of the vehicles from each other in a subminiature mobility field.

In accordance with various aspects of the present invention, the above and other objects may be accomplished by the provision of a mobility unit including a driving portion connected to a driveshaft of a vehicle for providing driving force to the vehicle, a rear glass portion provided at a rear portion of the vehicle to be operable to isolate the rear portion of the vehicle, a front connection portion or a rear connection portion provided at the front or at the rear of the vehicle to be fastened to another vehicle, and an integrated controller for controlling the operation of the front connection portion or the rear connection portion depending on the direction in which the vehicle is coupled to another vehicle and controlling the operation of the rear glass portion and the driving portion when the vehicle is coupled to another vehicle.

In the case in which the vehicle and another vehicle are coupled to each other and in which the vehicle has driving priority, the vehicle may be disposed in front of another vehicle in the direction in which the vehicle advances, and the integrated controller may perform control such that the rear connection portion of the vehicle is fastened to the front connection portion of another vehicle.

In the case in which the vehicle and another vehicle are coupled to each other and in which the vehicle has driving priority, the vehicle may be disposed in front of another vehicle in the direction in which the vehicle advances, and the integrated controller may perform control such that the rear connection portion of the vehicle is fastened to the rear connection portion of another vehicle.

The rear glass portion may be adjustable in transparency, and may become opaque when the isolation operation thereof is performed.

The rear glass portion may include a first rear glass portion and a second rear glass portion, the first rear glass portion may be provided at the lower side of the rear portion of the vehicle, the second rear glass portion may be provided at the upper side of the rear portion of the vehicle, and the second rear glass portion may be slidable downwards and upwards to open or close the upper side of the rear portion of the vehicle, respectively.

In the case in which the vehicle is coupled to another vehicle and the vehicle has driving priority, the integrated controller may have priority to control the driving portion or the second rear glass portion of the vehicle and a driving portion or a second rear glass portion of another vehicle.

In a case in which the vehicle and another vehicle are coupled to each other, the integrated controller may perform control such that the driving portion of the vehicle is operated.

In the case in which the vehicle and another vehicle are coupled to each other, the integrated controller may perform control such that the driving portion of another vehicle is operated.

The integrated controller may perform control such that the rear connection portion of the vehicle and the rear connection portion of another vehicle are coupled to each other and such that the second rear glass portions of the vehicle and another vehicle slide downwards, whereby the internal space of the vehicle and the internal space of another vehicle are connected to each other.

The integrated controller may perform control such that the rear connection portion of the vehicle and the rear connection portion of another vehicle are coupled to each other and such that the second rear glass portions of the vehicle and another vehicle do not slide downwards, whereby the internal space of the vehicle and the internal space of another vehicle are not connected to each other.

The integrated controller may perform control such that the second rear glass portions of the vehicle and another vehicle become opaque, whereby the internal space of the vehicle and the internal space of another vehicle are isolated from each other.

In the case in which the residual energy in the driving portion of the vehicle is greater than the residual energy in the driving portion of another vehicle, the integrated controller may perform control such that the energy in the driving portion of the vehicle is used.

In the case in which the residual energy in the driving portion of another vehicle is greater than the residual energy in the driving portion of the vehicle, the integrated controller may perform control such that the energy in the driving portion of another vehicle is used.

The integrated controller may perform control such that the energy in the driving portion of the vehicle and the energy in the driving portion of another vehicle are used in the same amount.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 8 is a conceptual view of the vehicle according to the exemplary embodiment of the present invention and another vehicle.

Figure 1:
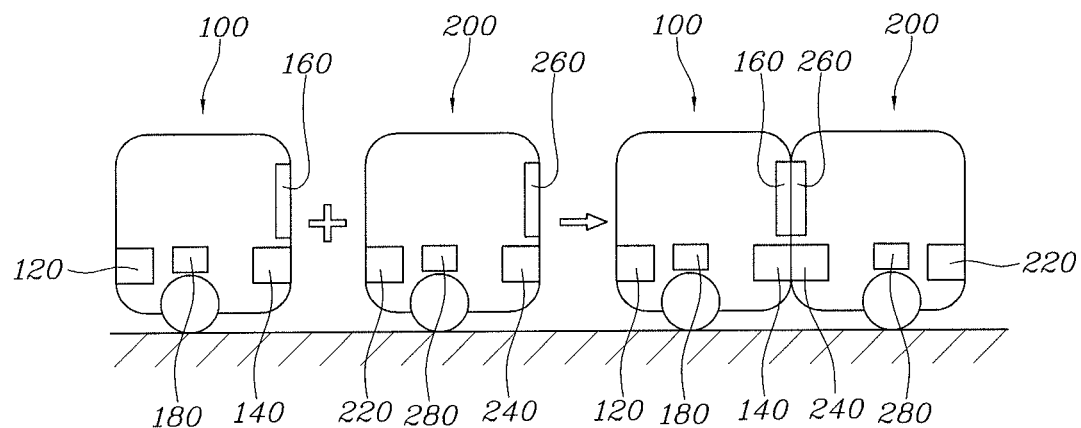
FIG. 1 is a view showing the states before and after a vehicle according to an exemplary embodiment of the present invention and another vehicle are coupled to each other.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2:
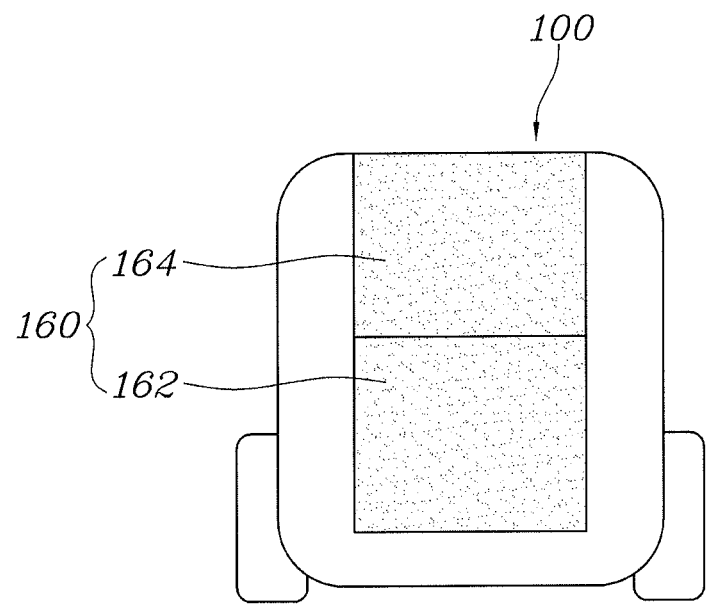
FIG. 2 is a view showing a first rear glass portion and a second rear glass portion of a mobility unit according to an exemplary embodiment of the present invention.
Figure 3:
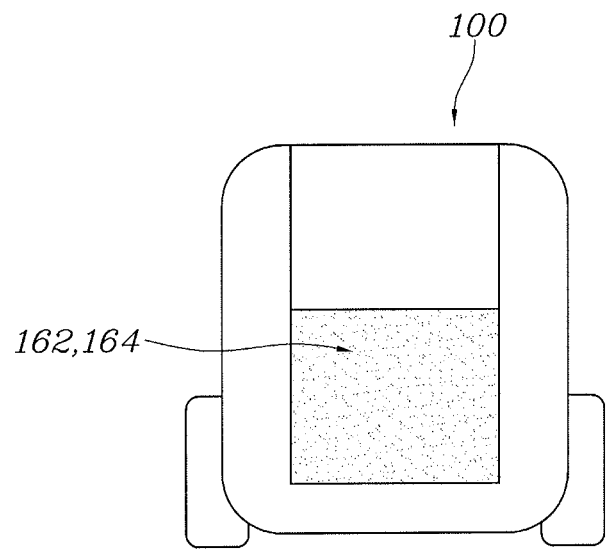
FIG. 3 is a view showing the state in which the second rear glass portion of the mobility unit according to the exemplary embodiment of the present invention slides downwards.
Figure 4:
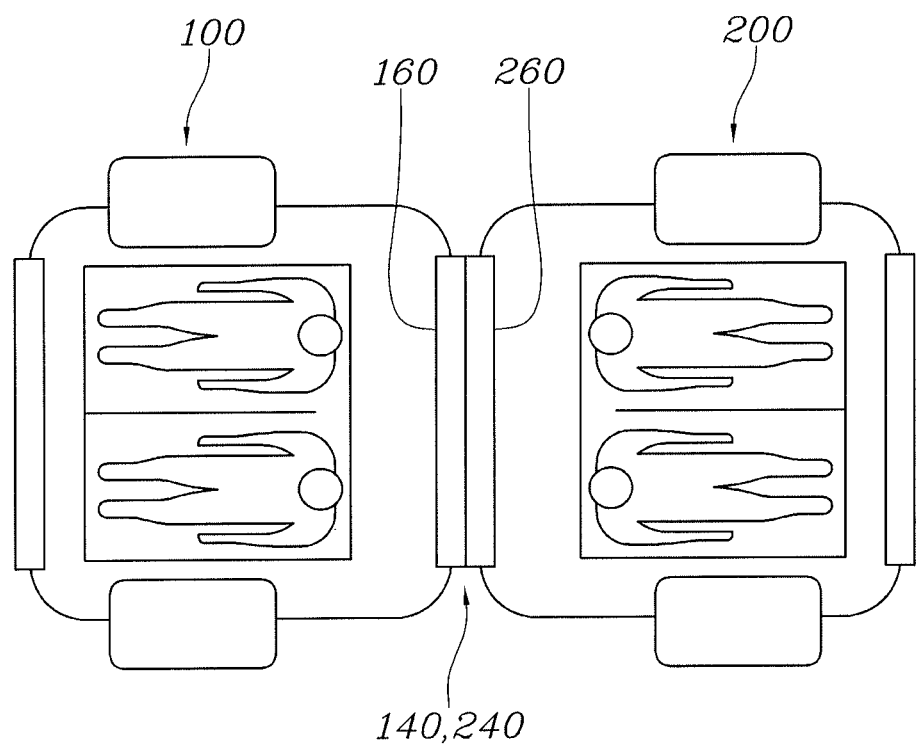
FIG. 4 is a view showing the state in which a rear connection portion of the vehicle according to the exemplary embodiment of the present invention and a rear connection portion of another vehicle are coupled to each other.
Figure 5:
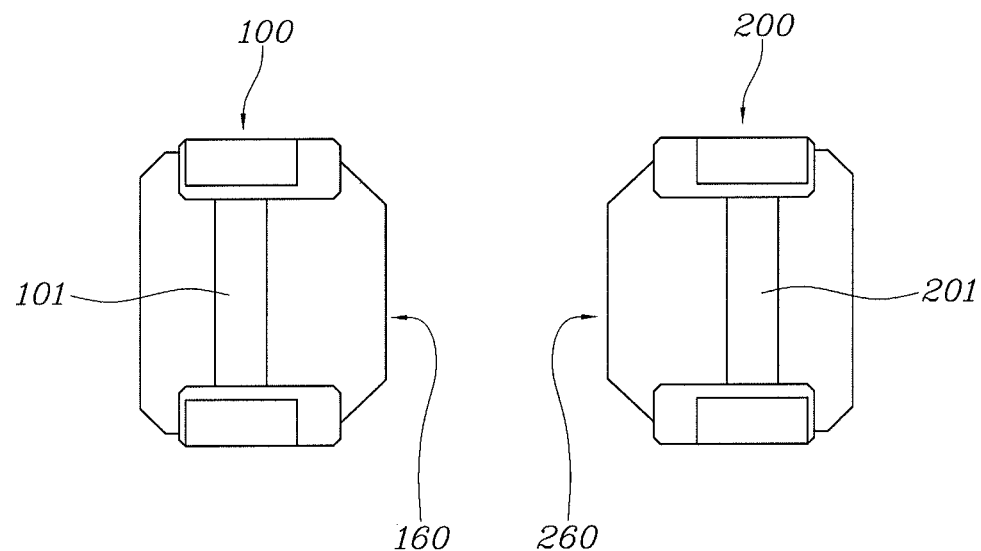
FIG. 5 and FIG. 6 are views showing a driving portion of the vehicle according to the exemplary embodiment of the present invention and a driving portion of another vehicle before and after the vehicle and another vehicle are coupled to each other.
Figure 6:
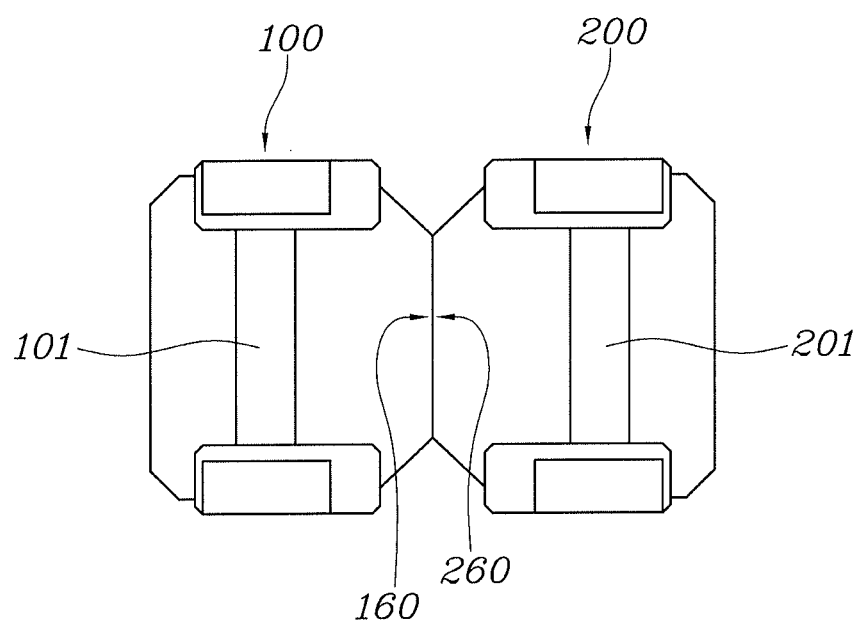
Figure 7:
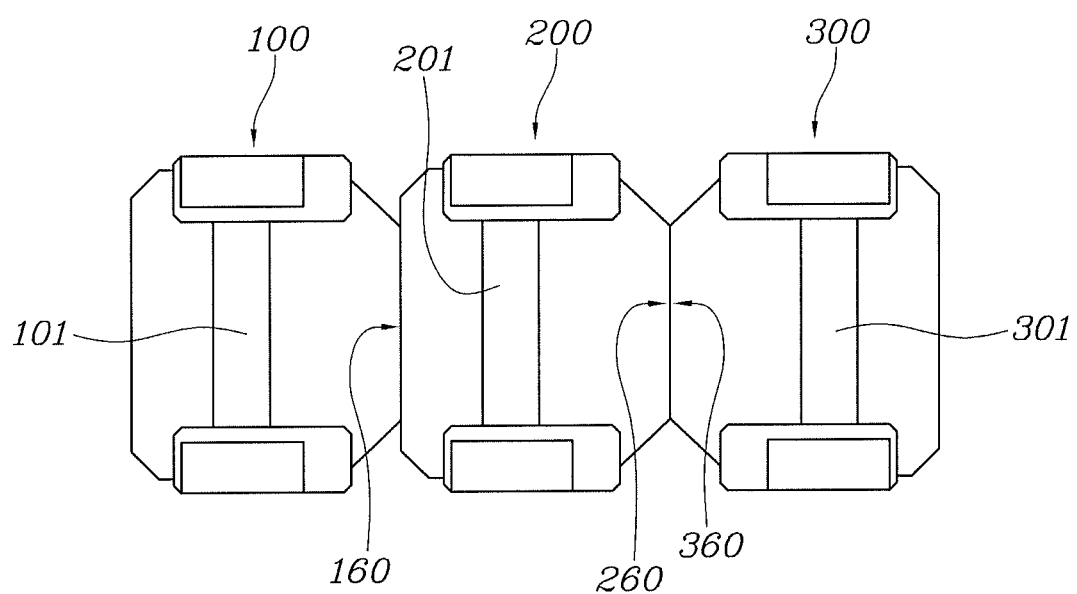
FIG. 7 is a view showing the state in which three mobility units are fastened to each other.

FIG. 1 is a view showing the states before and after a vehicle according to an exemplary embodiment of the present invention and another vehicle are coupled to each other, FIG. 2 is a view showing a first rear glass portion and a second rear glass portion of a mobility unit according to an exemplary embodiment of the present invention, FIG. 3 is a view showing the state in which the second rear glass portion of the mobility unit according to the exemplary embodiment of the present invention slides downwards, FIG. 4 is a view showing the state in which a rear connection portion of the vehicle according to the exemplary embodiment of the present invention and a rear connection portion of another vehicle are coupled to each other, FIG. 5 and FIG. 6 are views showing a driving portion of the vehicle according to the exemplary embodiment of the present invention and a driving portion of another vehicle before and after the vehicle and another vehicle are coupled to each other, FIG. 7 is a view showing the state in which three mobility units are fastened to each other, and FIG. 8 is a conceptual view of the vehicle according to the exemplary embodiment of the present invention and another vehicle.

Referring to FIGS. 1 and 8, a mobility unit according to an exemplary embodiment of the present invention includes a driving portion 101 connected to a driveshaft of a vehicle for providing driving force to the vehicle 100, a rear glass portion 160 provided at the rear portion of the vehicle 100 to be operable to isolate the rear portion of the vehicle 100, a front connection portion 120 or a rear connection portion 140 provided at the front or at the rear of the vehicle 100 to be fastened to another vehicle 200 having a rear glass portion 260, and an integrated controller 180 for controlling the operation of the front connection portion 120 or the rear connection portion 140 depending on the direction in which the vehicle 100 is fastened to another vehicle 200 and controlling the operation of the rear glass portion 160 and the driving portion 101 when the vehicle 100 is fastened to another vehicle 200.

Hereinafter, "vehicle 100" will be defined as one's own vehicle, and "another vehicle 200" will be defined as an adjacent vehicle to be fastened to the vehicle 100.

In an exemplary embodiment of the present invention, the mobility unit includes the driving portion 101. The driving portion 101 is connected to the driveshaft to provide a driving force to the vehicle 100. The present invention may be appropriately applied to a vehicle driven using a battery and a motor, such as an electric vehicle or a fuel-cell vehicle, and may also be applied to an internal combustion engine vehicle. Furthermore, the present invention may be applied to a future-type subminiature mobility (a single-seated vehicle or a two-seated vehicle), although the present invention is configured for being applied to various types of vehicles. In an exemplary embodiment of the present invention, the driving portion 101 includes a motor and a battery.

In an exemplary embodiment of the present invention, the mobility unit includes the rear glass portion 160, which is operable to isolate the rear portion of the vehicle 100. The rear glass portion 160 is provided at the rear portion of the vehicle, and isolates the internal space of the vehicle 100 from the outside.

In an exemplary embodiment of the present invention, the mobility unit includes the front connection portion 120 and the rear connection portion 140, each of which is fastened to another vehicle 200 such that subminiature mobilities can travel in the grouped state or in the coupled state. The front connection portion 120 is provided at the front of the vehicle 100, and the rear connection portion 140 is provided at the rear of the vehicle 100. In the instant case, a mechanical locking device or an electronic locking device may be used as each of the front connection portion 120 and the rear connection portion 140. In addition to the locking device, a sensor for detecting locking may be further provided. The sensor detects whether the vehicle 100 and another vehicle 200 are locked to each other. Meanwhile, in the case in which the vehicle 100 is coupled to another vehicle 200, the front connection portion 120 or the rear connection portion 140 of the vehicle 100 is fastened to a front connection portion 220 or a rear connection portion 240 of another vehicle 200.

Referring to FIG. 1, the left portion of FIG. 1 shows the state in which the vehicle 100 and another vehicle 200 travel independently, and the right portion of FIG. 1 shows the state in which the vehicle 100 and another vehicle 200 travel in the coupled state.

Referring to FIG. 8, the mobility unit according to an exemplary embodiment of the present invention includes the integrated controller 180 to couple or aggregate the vehicle 100 and another vehicle 200 to each other.

In an exemplary embodiment of the present invention, the integrated controller 180 may be realized by a non-volatile memory configured to store an algorithm for controlling the operation of various elements of a vehicle or data on software commands for executing the algorithm and a processor configured to perform the operation, which will be described below, using the data stored in the memory. Here, the memory and the processor may be realized as individual chips. Alternatively, the memory and the processor may be realized as a single integrated chip. The processor may include one or more processors.

The integrated controller 180 controls the operation of the front connection portion 120 or the rear connection portion 140 depending on the direction in which the vehicle 100 is fastened to another vehicle 200, and controls the operation of the rear glass portion 160 and the driving portion 101 when the vehicle 100 is fastened to another vehicle 200. In the case in which the front of the vehicle 100 is fastened to another vehicle 200, the integrated controller 180 performs control such that the front connection portion 120 is fastened to another vehicle 200. In the case in which the rear of the vehicle 100 is fastened to another vehicle 200, the integrated controller 180 performs control such that the rear connection portion 140 is fastened to another vehicle 200. In the case of coupled travel or aggregate travel, the integrated controller 180 may control the operation of the rear glass portion 160 and the driving portion 101.

A more detailed description will be provided with reference to FIG. 1. In an exemplary embodiment of the present invention, in the case in which the vehicle 100 and another vehicle 200 are fastened to each other and in which the vehicle 100 has driving priority, the vehicle 100 may be disposed in front of another vehicle 200 in the direction in which the vehicle 100 advances, and the integrated controller 180 may perform control such that the rear connection portion 140 of the vehicle 100 is fastened to the front connection portion 220 of another vehicle 200. Furthermore, in the case in which the vehicle 100 and another vehicle 200 are fastened to each other and in which the vehicle 100 has driving priority, the vehicle 100 may be disposed in front of another vehicle 200 in the direction in which the vehicle 100 advances, and the integrated controller 180 may perform control such that the rear connection portion 140 of the vehicle 100 is fastened to the rear connection portion 240 of another vehicle 200.

In an exemplary embodiment of the present invention, the vehicle 100 and another vehicle 200 may be coupled to each other to perform coupled travel or aggregate travel. In the instant case, the vehicle 100 and another vehicle 200 may be matched with each other online, for example, through a social network or a mobile application, and the mobility having driving priority may be set in advance when the vehicle 100 and another vehicle 200 are matched with each other. It is obvious that, even while driving, it is possible to change the driving priority by mutual consent between the passengers in the vehicle 100 and another vehicle 200. Meanwhile, in the case in which the vehicle 100 and another vehicle 200 are fastened to each other and in which the vehicle 100 has driving priority, the vehicle 100 may be disposed in front of another vehicle 200 in the direction in which the vehicle 100 advances. The reason for this is that it is easy to secure a driver's field of view only when the vehicle 100 is disposed in front of another vehicle 200. In the instant case, the integrated controller 180 may control the operation of the rear connection portion 140 of the vehicle 100 such that the rear connection portion 140 of the vehicle 100 is fastened to the front connection portion 220 of another vehicle 200, and may control the operation of the rear connection portion 140 of the vehicle 100 such that the rear connection portion 140 of the vehicle 100 is fastened to the rear connection portion 240 of another vehicle 200.

Meanwhile, in an exemplary embodiment of the present invention, the rear glass portion 160 may be adjustable in transparency, and may become opaque when the isolation operation thereof is performed. The rear glass portion 160 may include any of various materials, the transparency of which is adjustable, such as smart glass or a transparent display.

In the case in which the vehicle 100 and another vehicle 200 perform coupled travel or aggregate travel as the result of coupling therebetween, the rear glass portion 160 may be maintained to be transparent such that the field of view is secured between the internal spaces of the vehicle 100 and another vehicle 200. On the other hand, the rear glass portion 160 may be maintained to be opaque such that the field of view between the internal spaces of the vehicle 100 and another vehicle 200 is blocked.

As shown in FIG. 2 and FIG. 3, the rear glass portion 160 may include a first rear glass portion 162 and a second rear glass portion 164. The first rear glass portion 162 may be provided at the lower side of the rear portion of the vehicle 100, and the second rear glass portion 164 may be provided at the upper side of the rear portion of the vehicle 100. The second rear glass portion 164 may be slidable downwards and upwards to open or close the upper side of the rear portion of the vehicle 100. The first rear glass portion 162 is provided at the lower side of the rear portion of the vehicle 100, and the second rear glass portion 164 is provided at the upper side of the rear portion of the vehicle 100. The second rear glass portion 164 is disposed above the first rear glass portion 162. In the instant case, the first rear glass portion 162 and the second rear glass portion 164 close the rear portion of the vehicle 100, and the second rear glass portion 164 slides downwards to open the upper side of the rear portion of the vehicle 100. FIG. 2 is a view showing the state in which the second rear glass portion closes the upper side of the rear portion of the vehicle, and FIG. 3 is a view showing the state in which the second rear glass portion opens the upper side of the rear portion of the vehicle.

As shown in FIG. 2 and FIG. 3, the rear glass portion 160 may include a first rear glass portion 162 and a second rear glass portion 164.

Meanwhile, referring to FIG. 8, in the case in which the vehicle 100 is fastened to another vehicle 200 and in which the vehicle 100 has driving priority, the integrated controller 180 may have priority to control the driving portions 101 and 201 or the second rear glass portions 164 and 264 of the vehicle 100 and another vehicle 200. In the case in which the vehicle 100 and another vehicle 200 are fastened to each other, the integrated controller 180 or 280 of the mobility having driving priority has priority to control the driving portions 101 and 201 or the second rear glass portions 164 and 264. The following description will be provided by way of example on the assumption that the vehicle 100 has control priority. Meanwhile, in the case in which the vehicle 100 is fastened to another vehicle 200 and in which the vehicle 100 has driving priority, the integrated controller 180 of the vehicle 100 may have priority to control the driving portions 101 and 201 or the second rear glass portions 164 and 264 of the vehicle 100 and another vehicle 200, and may thus control the operation of the driving portions 101 and 201 or the second rear glass portions 164 and 264. In contrast, in the case in which another vehicle 200 has driving priority, the integrated controller 280 of another vehicle 200 may have priority to control the driving portions 101 and 201 or the second rear glass portions 164 and 264 of the vehicle 100 and another vehicle 200.

In the case in which the vehicle 100 and another vehicle 200 are fastened to each other, the integrated controller 180 may perform control such that the driving portion 101 of the vehicle 100 is operated. Also, in the case in which the vehicle 100 and another vehicle 200 are fastened to each other, the integrated controller 180 may perform control such that the driving portion 201 of another vehicle 200 is operated.

In the case in which the vehicle 100 has driving priority and is disposed in front of another vehicle 200 in the direction in which the vehicle 100 advances, when the driving portion 101 of the vehicle 100 is operated, the vehicle 100 and another vehicle 200 may be fastened to each other in a front-wheel-drive arrangement. In the instant case, when the driving portion 201 of another vehicle 200 is operated, the vehicle 100 and another vehicle 200 may be fastened to each other in a rear-wheel-drive arrangement. In contrast, in the case in which the vehicle 100 has driving priority and is disposed at the rear of another vehicle 200 in the direction in which the vehicle 100 advances, when the driving portion 101 of the vehicle 100 is operated, the vehicle 100 and another vehicle 200 may be fastened to each other in a rear-wheel-drive arrangement. In the instant case, when the driving portion 201 of another vehicle 200 is operated, the vehicle 100 and another vehicle 200 may be fastened to each other in a front-wheel-drive arrangement.

FIG. 4 is a view showing the state in which the rear portion of the vehicle and the rear portion of another vehicle are coupled to each other. Referring to FIGS. 1 and 8, in an exemplary embodiment of the present invention, the integrated controller 180 may perform control such that the rear connection portion 140 of the vehicle 100 and the rear connection portion 140 of another vehicle 200 are fastened to each other and such that the second rear glass portions 164 and 264 of the vehicle 100 and another vehicle 200 slide downwards, whereby the internal space of the vehicle 100 and the internal space of another vehicle 200 are connected to each other.

When the rear connection portion 140 of the vehicle 100 and the rear connection portion 140 of another vehicle 200 are fastened to each other and the second rear glass portions 164 and 264 slide downwards, the upper side of the rear portion of each of the vehicle 100 and another vehicle 200 is opened. As a result, the internal space of the vehicle 100 and the internal space of another vehicle 200 may be connected to each other. In the instant case, the vehicle 100 and another vehicle 200 may communicate with each other.

The integrated controller 180 may perform control such that the rear connection portion 140 of the vehicle 100 and the rear connection portion 140 of another vehicle 200 are fastened to each other and such that the second rear glass portions 164 and 264 of the vehicle 100 and another vehicle 200 do not slide downwards, whereby the internal space of the vehicle 100 and the internal space of another vehicle 200 are not connected to each other. In the instant case, the vehicle 100 and another vehicle 200 do not communicate with each other, protecting privacy.

The integrated controller 180 may perform control such that the second rear glass portions 164 and 264 of the vehicle 100 and another vehicle 200 become opaque, whereby the internal space of the vehicle 100 and the internal space of another vehicle 200 are isolated from each other. In the instant case, the second rear glass portions 164 and 264 become opaque, whereby the vehicle 100 and another vehicle 200 are completely isolated from each other. In the instant case, each of the second rear glass portions 164 and 264 may be made of smart glass or a transparent display that becomes opaque.

FIG. 5 is a view showing the driving portion of the vehicle and the driving portion of another vehicle before the vehicle and another vehicle are coupled to each other, and FIG. 6 is a view showing the driving portion of the vehicle and the driving portion of another vehicle after the vehicle and another vehicle are coupled to each other. FIG. 8 is a conceptual view of the vehicle according to the exemplary embodiment of the present invention and another vehicle.

Meanwhile, in an exemplary embodiment of the present invention, in the case in which the residual energy in the driving portion 101 of the vehicle 100 is greater than the residual energy in the driving portion 201 of another vehicle 200, the integrated controller 180 may perform control such that the energy in the driving portion 101 of the vehicle 100 is used. Energy transmission and reception portions may be provided at the front connection portions 120 and 220 or the rear connection portions 140 and 240 of the vehicle 100 and another vehicle 200, in addition to the locking device, such that energy is transmitted between the driving portion 101 of the vehicle 100 and the driving portion 201 of another vehicle 200. Even in the case in which the driving portion 201 of another vehicle 200 is used, therefore, the integrated controller 180 may perform control such that the energy in the driving portion 101 of the vehicle 100 is supplied to the driving portion 201 of another vehicle 200.

In contrast, in the case in which the residual energy in the driving portion 201 of another vehicle 200 is greater than the residual energy in the driving portion 101 of the vehicle 100, the integrated controller 180 may perform control such that the energy in the driving portion 201 of another vehicle 200 is supplied to the driving portion 101 of the vehicle 100.

Furthermore, the integrated controller 180 may perform control such that the energy in the driving portion 101 of the vehicle 100 and the energy in the driving portion 201 of another vehicle 200 are used in the same amount. In the instant case, the ratio in energy use of the driving portion 101 of the vehicle 100 to the driving portion 201 of another vehicle 200 is 1:1.

FIG. 7 is a view showing the state in which three mobility units are fastened to each other. A further vehicle 300 may be coupled to the vehicle 100 and another vehicle 200 such that the vehicles perform aggregate travel or coupled travel. The front connection portions or the rear connection portions of the three mobility units may be connected to each other such that the vehicles perform aggregate travel or coupled travel.

As is apparent from the above description, the mobility unit according to an exemplary embodiment of the present invention is configured for coupling a vehicle and another vehicle and connecting internal spaces of the vehicles to each other or isolating the internal spaces of the vehicles from each other.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A mobility unit capable of coupling a vehicle and another vehicle to connect internal spaces of the vehicle and another vehicle to each other, the mobility unit comprising:
   a driving portion connected to a driveshaft of the vehicle for providing driving force to the vehicle;
   a glass portion mounted at a rear portion of the vehicle to be operable to selectively isolate the rear portion of the vehicle from the outside of the vehicle;
   a front connection portion or a rear connection portion disposed at a front or at a rear of the vehicle to be selectively coupled to another vehicle; and
   a controller electrically-connected to the front connection portion or the rear connection portion and configured for controlling an operation of the front connection portion or the rear connection portion depending on a direction in which the vehicle is coupled to another vehicle and controlling an operation of the glass portion and the driving portion when the vehicle is coupled to another vehicle,
   wherein the glass portion includes a first glass portion and a second glass portion,
   wherein the first glass portion is provided at a lower side of the rear portion of the vehicle,
   wherein the second glass portion is provided at an upper side of the rear portion of the vehicle,
   wherein the second glass portion is slidable downwards and upwards of the mobility unit to open and close the upper side of the rear portion of the vehicle,
   wherein the controller is configured to perform control such that the rear connection portion of the vehicle and a rear connection portion of another vehicle are coupled to each other, and
   wherein the controller is configured to perform control such that the second glass portion of the vehicle and a second glass portion of another vehicle become opaque, whereby the internal space of the vehicle and the internal space of another vehicle are isolated from each other.

2. The mobility unit according to claim 1, wherein when the vehicle has a driving priority and is disposed in a front of another vehicle in a direction in which the vehicle advances, the controller is configured to perform control such that the rear connection portion of the vehicle is coupled to the front connection portion of another vehicle.

3. The mobility unit according to claim 1, wherein when the vehicle has a driving priority and is disposed in a front of another vehicle in a direction in which the vehicle advances, the controller is configured to perform control such that the rear connection portion of the vehicle is coupled to the rear connection portion of another vehicle.

4. The mobility unit according to claim 1, wherein the glass portion is adjustable in transparency, and becomes opaque when an isolation operation of the glass portion is performed.

5. The mobility unit according to claim 1, wherein, when the vehicle is coupled to another vehicle and has a driving priority, the controller has a priority to control the driving portion or the glass portion of the vehicle and a driving portion or a glass portion of another vehicle.

6. The mobility unit according to claim 5, wherein, when the vehicle is coupled to another vehicle and has a driving priority, the controller has a priority to control the driving portion or the second glass portion of the vehicle and the driving portion or the second glass portion in the glass portion of another vehicle, wherein the glass portion of another vehicle includes a first glass portion and the second glass portion.

7. The mobility unit according to claim 6, wherein, when the vehicle and another vehicle are coupled to each other, the controller is configured to perform control such that the driving portion of the vehicle is operated.

8. The mobility unit according to claim 6, wherein, when the vehicle and another vehicle are coupled to each other, the controller is configured to perform control such that the driving portion of another vehicle is operated.

9. The mobility unit according to claim 6, wherein the controller is configured to perform control such that the rear connection portion of the vehicle and the rear connection portion of another vehicle are coupled to each other and that the second glass portions of the vehicle and another vehicle slide downwards, whereby the internal space of the vehicle and the internal space of another vehicle are connected to each other.

10. The mobility unit according to claim 7, wherein the controller is configured to perform control such that the second glass portions of the vehicle and another vehicle do not slide downwards, whereby the internal space of the vehicle and the internal space of another vehicle are not connected to each other.

11. The mobility unit according to claim 1, wherein, when a residual energy in the driving portion of the vehicle is greater than a residual energy in a driving portion of another vehicle, the controller is configured to perform control such that the residual energy in the driving portion of the vehicle is used.

12. The mobility unit according to claim 1, wherein, when a residual energy in a driving portion of another vehicle is greater than a residual energy in the driving portion of the vehicle, the controller is configured to perform control such that the residual energy in the driving portion of another vehicle is used.

13. The mobility unit according to claim 1, wherein the controller is configured to perform control such that an energy in the driving portion of the vehicle and an energy in a driving portion of another vehicle are used in a same amount.

* * * * *